United States Patent [19]

Hansen

[11] Patent Number: 5,265,979
[45] Date of Patent: Nov. 30, 1993

[54] HIGH EFFICIENCY WASTE PLACEMENT SYSTEM FOR MUNICIPAL LANDFILLS

[75] Inventor: David L. Hansen, Averill Park, N.Y.

[73] Assignee: Landfill Service Corporation, Apalachin, N.Y.

[21] Appl. No.: 992,073

[22] Filed: Dec. 17, 1992

Related U.S. Application Data

[63] Continuation-in-part of Ser. No. 966,269, Oct. 26, 1992, which is a continuation-in-part of Ser. No. 674,864, Mar. 25, 1991, Pat. No. 5,161,915.

[51] Int. Cl.$^5$ ................................................. B09B 1/00
[52] U.S. Cl. ..................................... 405/129; 405/266; 588/252
[58] Field of Search ............... 405/128, 129, 258, 263, 405/264, 266; 47/9; 106/706, 718, 901; 588/249, 252, 257

[56] References Cited

U.S. PATENT DOCUMENTS

| | | | |
|---|---|---|---|
| 3,705,851 | 12/1972 | Brauer | 405/129 X |
| 5,040,920 | 8/1991 | Forrester | 405/129 |
| 5,051,031 | 9/1991 | Schumacher et al. | 405/129 |
| 5,054,406 | 10/1991 | Judd | 405/129 X |
| 5,120,160 | 6/1992 | Schwengel | 405/128 |
| 5,161,915 | 11/1992 | Hansen | 405/129 |

Primary Examiner—David H. Corbin
Attorney, Agent, or Firm—Heslin & Rothenberg

[57] ABSTRACT

A high efficiency waste placement and disposal method for disposing of solid waste in a landfill includes size reducing the solid waste, moisture adjusting the solid waste, placing the solid waste in a preselected geometric form thereby forming a waste pile, coating the exposed portion of the waste pile with a synthetic covering compound comprising a liquid, binder, cellulose fibers, and plastic fibers, biostabilizing the waste pile and compacting the waste pile. The waste is preferably placed in a matshaped stockpile for efficient biostabilization through sufficient aeration and moisture adjustment and compaction.

28 Claims, 2 Drawing Sheets

HIGH EFFICIENCY WASTE PLACEMENT SYSTEM FOR MUNICIPAL LANDFILLS

CROSS REFERENCES TO RELATED APPLICATION

This application is a continuation-in-part of U.S. Pat. application Ser. No. 07/966,269 filed on Oct. 26, 1992, which is a continuation-in-part of U.S. Pat. application Ser. No. 07/674,864 filed on Mar. 25, 1991, now U.S. Pat. No. 5,161,915.

TECHNICAL FIELD

The present invention relates to the field of waste management. More particularly, the invention relates to a method for efficiently and effectively placing and disposing of waste for municipal landfills.

BACKGROUND OF THE INVENTION

It is well-known today that both commercial and domestic activities produce an enormous amount of solid waste. Almost all of this waste is deposited into municipal landfills causing existing landfills to quickly fill to their capacity. Therefore, landfill space is significantly limited making it a valuable commodity. It is, therefore, necessary to efficiently utilize presently existing landfill space to its maximum landfill capacity. Developing new landfill sites or expanding existing ones could help alleviate the problem of dwindling landfill space. However, obtaining the necessary approvals for construction of new landfills on virgin land is extremely difficult. Therefore, this problem is preferably solved by maximizing the amount of solid waste existing landfill sites can handle.

U.S. Pat. No. 4,838,733 issued to Katz teaches that by compacting municipal waste, to increase its density, an existing landfill can contain a greater amount of solid waste. However, the problem with this technique is that biostabilization of the existing municipal solid waste is not facilitated. Compacting merely increases the density of the solid waste present within the landfill, without actually decreasing the amount of solid waste within the landfill. In fact, compaction of the waste impedes its biostabilization.

Techniques typically utilized in the disposal of other types of wastes create a number of problems when used for municipal solid waste disposal, particularly, within a landfill. For example, static pile aeration is conducted on concrete, other solid pavement, or virgin land and not on the landfill. When used in the landfill static pile aeration facilitates the intrusion of methane gas emanating from subsurface buried waste, differential settlement of the working surface, variation of water saturation elevations, and elevated water emissions. Also landfills are typically infested with nuisance vectors such as flies, insects, birds and animals which are attracted to municipal solid waste.

It is therefore an object of the present invention to provide a method for increasing the effective density (that is, the number of tons of waste received, measured by a weight scale, divided by the number of cubic yards of landfill volume consumed, measured by a topographic survey) of a typical municipal solid waste landfill which thereby conserves landfill capacity and is of significant commercial value to the landfill owner.

It is also an object of the present invention to provide a method of increasing the effective density of a landfill that does not impede the biostabilization process but rather enhances it, thereby reducing the actual amount of municipal solid waste.

It is a further object of the present invention to provide a method of landfill management capable of dealing with the unique problems associated with municipal landfills.

It is also an object of the present invention to provide a method for efficiently placing solid waste which utilizes readily available recycled waste materials.

SUMMARY OF THE INVENTION

The aforementioned objects are achieved by utilizing a high efficiency waste placement system for municipal landfills in accordance with the present invention.

The system encompasses a process for efficiently placing and disposing of municipal solid waste in landfills. The process includes size reducing and moisture adjusting the municipal solid waste; placing the waste in a set form; coating the exposed portion of the waste pile with a synthetic covering compound; biostabilizing the solid waste within the waste pile; and, compacting the waste pile. Waste may be aerated may also be placed in a substantially mat-shaped form. Aeration means may be placed within the waste when stockpiled and used to aerate the waste. This method may be repeated upon the same area thereby forming a series of layers of compacted biostabilized solid waste.

The synthetic covering compound utilized in the method described above may comprise a mixture of a liquid, a binder, cellulose fibers and plastic fibers. The liquid used within this synthetic covering compound may comprise water, landfill, leachate, and/or industrial waste water. The binder may comprise cement kiln dust, fly ash with portland cement or portland cement. The cellulose fibers may include shredded paper and/or finely shredded wood fibers. The plastic fibers may comprise polyethylene terephthalate fibers.

The mixture may comprise approximately thirty percent to sixty percent by weight liquid, approximately forty percent to seventy percent by weight binder, approximately one half percent to ten percent by weight cellulose fibers, and approximately two percent or less by weight plastic fibers.

BRIEF DESCRIPTION OF THE DRAWINGS

The aforementioned objects and other advantages of the present invention may be best understood with reference to the following detailed description when read in conjunction with the drawings, in which.

DETAILED DESCRIPTION

Figure 1:
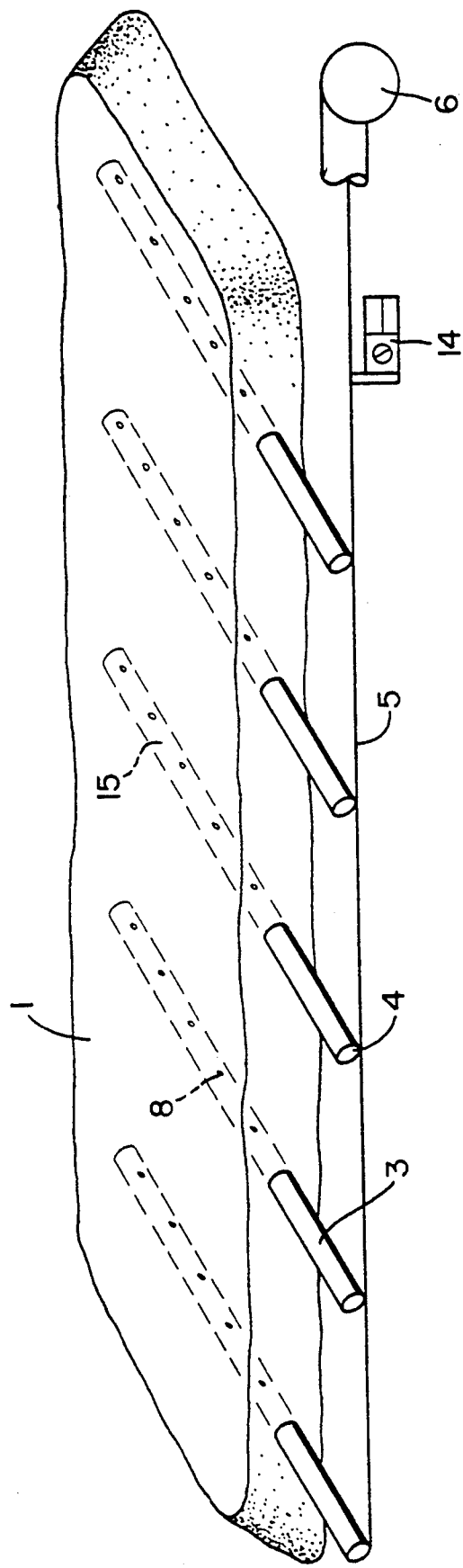
FIG. 1 depicts a mat-shaped stockpile of municipal solid solid waste having a piping network therein capable of being constructed on a landfill in accordance with the principles of the present invention.

The present invention involves a system that creates an increased effective landfill density thereby conserving landfill capacity while fostering the biostabilization of the municipal solid waste. This system includes: shredding the waste, moisture adjusting the waste, placing the waste in a specific configuration, installing an aeration system in the waste pile, covering the waste pile with a synthetic cover, performing static pile aerobic decomposition (biostabilizing), compacting the waste pile and covering the compacted waste pile with a synthetic cover.

An initial step of the present invention is to reduce the solid waste into smaller sized particles. This is referred to as size reducing and is commonly accomplished by shredding the municipal solid waste. Typically much of the municipal solid waste deposited in a landfill is received in densely packed plastic bags which effectively prevents decomposition and biostabilization. Shredding decreases the density of the solid waste thereby facilitating biostabilization. Size reduction, by shredding or otherwise, may be performed using a wide variety of commercially available technology and equipment specifically designed for reducing waste. Examples are shear shredders, hammer mills, and even bulldozers utilized in the appropriate manner could suffice. Preferably the waste should be shredded to a nominal 2 to 6 inch particle size to facilitate biostabilization.

The solid waste to be disposed should be moisture adjusted to such a degree that the moisture content sufficiently promotes aerobic biostabilization. If the moisture content is too low, biostabilization will be impeded and the time for the municipal solid waste to completely biostabilize will increase. However, if the moisture content is too high, the municipal solid waste may generate leachate which is highly undesirable since there is a tendency for it to seep into the ground water and other areas of concern. Ideally the moisture content of the municipal solid waste should be 40 to 60 percent by weight. Often, visual inspection of the municipal solid waste will enable one to determine if the moisture content is adequate. Visible liquid and/or puddles within the waste may indicate that the moisture content is too high. One technique for moisture adjusting municipal solid waste having a moisture content that is exceedingly high is by mixing the overmoisturized municipal solid waste with dry municipal solid waste. An inadequate moisture content may be visibly apparent if all of the solid waste is not wet and there are dry sections. The moisture adjusting should result in municipal solid waste that has no excess amounts of water and yet has no dry areas.

Moisture adjusting may be performed with use of agricultural type spray irrigation units which are capable of supplying approximately 500 gallons/minute of water to the selected area of stockpiled waste. The amount of water to be applied can be easily determined by calculating the appropriate weight of the dry waste using density and volume values and adding an amount of water which would yield a moisture content of 40 to 60 percent by weight.

The municipal solid waste may be reduced and moisture adjusted simultaneously. This allows the water, or other liquid, to be uniformly distributed and absorbed into the solid waste. This will help to maintain desired relative humidity conditions in interstitial gases generated during the subsequent biostabilization. Also, simultaneous shredding and wetting of municipal solid waste greatly aides in saprobe (aerobic decay microbes) distribution resulting in a more uniform biostabilization rate throughout the mass of waste.

After the municipal solid waste has been shredded and moisture adjusted, it may be placed into a specific and predetermined form. Forms that are substantially geometric and symmetrical are preferred because they will typically be the most convenient for the landfill owner to effectively duplicate and will also aid in the biostabilization process discussed herein below. The shredded and moisture adjusted municipal solid waste may be placed in the appropriate form with the use of a conventional track loader.

Referring to FIG. 1, it is preferred to place the material into a mat-like shaped pile 1 having a length and width which is substantially greater than its thickness. For example, the mat 1 of solid waste may be approximately 9 feet thick or 100 feet wide with the length of the stockpile mat-shaped waste being dictated by the requirements of the specific landfill. The optimum depth is typically 6 to 9 feet, however, it may be as high as 30 feet and as low as 4 feet. Other geometric and preferably symmetrical configurations for the stockpile may be utilized without departing from the scope of the invention. For example, use of geometric shapes such as windows and the like which are capable of repeated mechanical manipulation may adequately suffice for this invention.

While the municipal solid waste is being placed or stockpiled in its predetermined form, a network of piping 15 may be placed therein in order to facilitate the biostabilization of the municipal solid waste. However, it is also possible to initially construct the pipe network 15 and thereafter place the municipal solid waste in a preselected configuration over the aeration means. Pipes 3 within the network act as an aeration means. The pipes are preferably located within the stockpiled municipal solid waste to create a substantially uniform air pressure at each location within the waste pile.

The placement of the pipe network 15 should be preferably at least 4 feet above the landfill surface 7 to protect against elevated water saturation levels. The air injection pipes 3 should, preferably, be placed at a level 5 feet above the bottom of the mat. When the piping network 15 is saturated by water or leachate, it may not be capable of effectively aerating stockpiled municipal solid waste. Therefore, the pipes 3 may be placed in their respective positions after 4 to 5 feet of municipal solid waste has been initially stockpiled. In addition, the exact placement of any aeration means, including pipes 3, will be dictated by the particular shape of the stockpiled waste 1. For example, when using a rectangular or mat-shaped waste pile 1, as is shown in FIG. 1, the pipes 3 should run perpendicular to the length of the pile 1 and parallel to the width at a distance of one-half the height of the pile 1. The pipes 3 should be spaced at equal distances from each other with perforations 8 in the pipes equally spaced throughout the entire stockpile 1. The maximum spacing between the pipes may be approximately 30 feet or less, any greater distance may yield unequal biostabilization. Each of the pipes extends from the waste pile 1 and is connected via an isolation valve 4 to a manifold 5. This manifold 5 may include a water control means 14 and is connected to a blower 6. The water control means 14 may inject water into the air from the blower to help maintain the moisture content of the stockpiled municipal solid waste 1. The blower 6 pumps air through the manifold 5 and through a series of isolation valves 4 and pipe 3. The air enters the waste pile 1 from perforations 8 within the pipes 3.

Schedule 80 PVC may be used for the injection pipes 3. The manifold 5 may be constructed of SDR 35 PVC, flexible ADS or other materials which are well-known in the art. DRUM model 600 blower driven by a DEUTZ diesel engine suffices for the needs of this invention. However, other blowers and engines will also suffice. The blower 6 should move air at a low pressure (0.5 to 5 psig) and at a high volume (i.e., greater than 500 cfm for each 200 tons of stockpiled municipal solid waste) into the air injection manifold 5. It will be apparent to one skilled in the art that other types of blowers, drive motors and/or piping may be used in accordance with the principles of the present invention.

The stockpiled municipal solid waste may be compacted, preferably after biostabilization has been achieved with conventional landfill compactors which are well-known in the art. The pipes 3 may be left in the pile 1 after the waste has fully biostabilized. Thereafter, the waste pile may be compacted thereby crushing and disposing of the pipes with the biostabilized municipal solid waste.

After the material has been placed in its appropriate configuration, the portion of the stockpile exposed to the air may be covered with a synthetic cover coating. The application of this coating on the outside of the stockpile protects the stockpile from vectors and blowing litter. The synthetic cover coating must itself be capable of disposal within a municipal landfill. Furthermore, in order to achieve the objects of the present invention, the synthetic cover cannot occupy a significant amount of space within the landfill. The synthetic cover may comprise a liquid, a binder, cellulose fibers and plastic fibers.

The constituents used in the liquid portion of the mixture may include water, landfill leachate, and/or industrial waste water. Although either of these three types of liquids will suffice, water is the preferred liquid constituent because it is easily available. Many different qualities of water may be used including turbid, polluted and non-potable water. Industrial waste water may also be used, provided that it does not contain pollutants which react with the other constituents during mixing. Landfill leachate, created by percolation of water through the varied refuse at a landfill, may also be used as a liquid constituent. Since disposal and treatment of landfill leachate are troublesome and expensive, use of landfill leachate may provide an effective method of its disposal. However, the use of landfill leachate and industrial waste water as a liquid constituent may require increased safety precautions.

The constituents which may be used as cellulose fibers include shredded newspaper, mixed types of shredded paper and/or shredded wood fiber. These cellulose fiber constituents may be used separately or in various combinations. Preferably, shredded newspaper or shredded mixed waste paper should be used because of its absorbability and availability. Newspapers may be shredded into particles, preferably less than one-half inch in any dimension. In order to insure proper liquid content in the total mixture, the shredded newspaper should not have more than a 6 percent, by weight, moisture content prior to mixing with the liquid constituent. Also, other finely shredded mixed papers usable as the cellulose fiber constituent should preferably be less than one-half inch in any dimension. These mixed paper fibers may include shredded magazines, phone books, corrugated containers, junk mail, office paper, etc. These shredded mixed papers should also be less than 6 percent by weight moisture content prior to mixing. Shredded wood fibers may also be used as a constituent provided that the wood fibers are finely shredded. The shredded wood fiber must be in a string or hair-like shape such as flexible excelsior. Wood chips are not satisfactory for use as the cellulose fiber constituent.

The constituents which may be used as plastic fibers include high density polyethylene, polyvinyl chloride as well as other types of plastics shredded into thin hair-like fibers. These hair-like fibers Polyethylene terephthalate fibers, such as TETROFLEX ® Type 401 fiber which are hair-like in diameter in between one-quarter to one-half inch long in length are preferred as the plastic constituent usable in the present invention. These fibers are manufactured from recycled products such as plastic soda containers.

The constituents which may be used as binders in the present invention include mineral binders such as cement kiln dust, fly ash with portland cement, cement kiln dust with bentonite, or stone dust with portland cement. Cement kiln dust, the preferred binder used in the present invention, is captured during the manufacture of portland cement by air pollution control devices. Although cement kiln dust is the preferred binder constituent, other pozzolonic binders may also be used. Also, bentonite may be added to kiln dust to form the binder constituent. The bentonite enhances the smoothness and consistency of the mixture and also increases its tactness and viscosity, enabling the mixture of the constituents forming the synthetic cover to better adhere to waste and cohere to itself. Approximately 5 percent, by weight, of the total mixture, of bentonite may be added. However, it is usually not necessary or required to have bentonite with the cement kiln dust as the binder constituent.

Fly ash and portland cement may also be used as the binder constituent. Fly ash are fine solid particles of ashes, dust and soot which evolve from burning fuel. The amount of portland cement used with the fly ash should be approximately 10 to 15 percent by weight of the total mixture. In lieu of fly ash, stone dust, derived from commercial stone crushing operations, may be used along with portland cement as a binder constituent. Accordingly, the amount of portland cement used with stone dust should also be between 10 to 15 percent, by weight of the total mixture.

The constituents of the mixture forming the synthetic cover: liquid, binder, cellulose fibers and plastic fibers should be combined within specific ratios. The amount of liquid should be between 30 and 60 percent, but preferably, between 38 and 45 percent, by weight of the total mixture. The amount of binder in the total mixture should be between 40 and 70 percent, but preferably, between 38 and 45 percent, by weight. The total amount of cellulose fiber in the mixture should be between ½ and 10 percent, but preferably between ½ and 2 percent, by weight. The amount of plastic fiber used in the mixture may be up to 2 percent, or less, of the mixture by weight.

The exact percentage of each constituent used to create the mixture may depend upon the weather conditions which exist during mixing and application of the synthetic cover. For example, at relatively higher temperatures, the amount of liquid used in the total mixture will be higher than the amount of liquid used at lower temperatures. However, the total amounts used should stay within the above stated ranges despite such weather variations. The amount of binder used in the mixture, unlike the liquid, will be higher on a cold day compared to the amount of binder used in the mixture on a hot day. The amount of cellulose fiber used is also dependent upon rain fall. On a day when rainfall is present, the amount of cellulose fiber should be a relatively higher percentage of the total weight of the mixture. Accordingly, the higher the rainfall, the higher the amount of cellulose fiber used. However, the amount of constituents used should remain within the aforementioned ranges despite changes in weather conditions.

Using the aforementioned materials as constituents will result in a mixture which may be applied, by spraying or another manner, to a waste pile to form a cover which will minimize odor and prevent vectors such as birds, flies and other insects from feeding off the waste.

Since there is a large amount of municipal solid waste to be disposed of within the landfills, the waste piles themselves will be large. Accordingly, it is necessary to utilize a synthetic cover capable of economical use on large areas. Synthetic cover application equipment manufactured by Landfill Service Corporation of Apalachin, NY, may be used to mix and supply the ingredients necessary to produce the synthetic cover.

The synthetic cover for waste piles may be mixed by filling a mixture tank with a predetermined amount of liquid constituent such as water, landfill leachate, industrial waste water or any other water based compound that does not react with the constituents therein. The proper amount of cellulose fibers and plastic fibers are then loaded into the mixture tank containing the liquid. Optionally, a coloring agent, also available from Landfill Service Corporation, may be added if desired. An agitator is then activated such that the cellulose fibers and plastic fibers are mixed with the liquid. Typically, it is necessary to activate the agitator for approximately one minute or longer to adequately mix the liquid, cellulose and plastic fibers together. The binding agent is then placed into the mixer where it is thoroughly agitated with the liquid, cellulose fibers and plastic fibers. The mixing time necessary to yield a mixture with the proper consistency may vary depending on the percentage of each constituent added to the mixture. In addition, weather conditions such as temperature and humidity may affect the length of time that the binder must be mixed with the liquid, cellulose fibers and plastic fibers. However, in all cases the materials should be mixed until the mixture becomes a thick viscous slurry having a "milk shake" type consistency.

When the mixture is properly agitated, a spray applicator is moved to the working area and the mixture is sprayed onto the waste pile surface using a motion similar to spray painting. The mixture is sprayed in such a manner that a uniform layer approximately one-eighth to one-quarter inch thick exists. After the entire surface area of the waste pile has been sprayed in this manner, the material will harden if undisturbed. When the mixture is applied at the proper consistency, it will resemble a coagulant type material which will adhere to the waste pile and cohere to itself. Typically, the material will dry and harden to resemble a stucco type finish within 24 hours. After the entire waste pile has been covered, the applicator and mixing unit must be cleaned out thoroughly when not in use so that the mixture remaining within the apparatus does not harden. Typically, water will suffice in cleaning the apparatus. For convenience, cleaning may occur directly on the landfill itself.

The manufacture, use and application of the synthetic cover for waste piles is more thoroughly described in U.S. Pat. application Ser. No. 674,864 filed on Mar. 25, 1991 and U.S. Pat. application Ser. No. 966,269 filed on Oct. 26, 1992, each of which is incorporated herein by reference and made a part of this disclosure.

Once the waste pile is covered and the synthetic cover has hardened, static pile aerobic decomposition of the waste pile may be conducted. Although aeration of the stockpiled waste may be accomplished in a multitude of ways, the piping network may be used as a means for directing forced air into the municipal solid waste in order to adequately aerate the municipal solid waste. Having a system of aeration pipes within the pile allows one to effectively control the interstitial gas conditions with considerably less effort. Such aeration allows for effective control over temperature as well as the resupply of oxygen within the substrate. The aeration of the stockpiled waste, referred to as static pile aerobic decomposition, facilitates biostabilization of the waste. When static pile aerobic decomposition is occurring, the municipal solid waste will generate heat. Substrate waste levels will reach temperatures ranging from 120° to 140° F. for several weeks indicating that biostabilization is occurring in the thermophylic range. If the temperature of the substrate exceeds 140°, undesirable bacteria begin to flourish and the desired bacteria which thrive on the low to medium range temperature will be harmed. Adequate aeration of the waste pile will effectively keep the temperature within the appropriate range. If the temperature has been brought down from over 140° to the appropriate 120°-140° range, the substrate temperature may again rise to 140°. When this occurs, the municipal solid waste may need to be reaerated. Again the piping network may be used as the aeration means and air pumped therethrough. If the temperatures never reaches the 120°-140° temperature range, or it falls below this range, it may be necessary to once again moisture adjust the waste within the stockpile. The waste may need to be reaerated and moisture adjusted more than once.

The synthetic cover will not impede the aeration of the stockpiled waste. Because the waste has been shredded, the surface of the stockpiled waste is not smooth and non-porous. Therefore, the applied synthetic cover does not result in a smooth uniform non porous coating. The coating, due to its consistency as applied to piles of solid waste, contains various pores and openings therein which allow air and interstitial gases to be exhausted therethrough during aeration. The aeration and biostabilization should be allowed to remain in the thermophylic stage of aerobic decomposition for a period of 60 to 90 days. The major portion of biostabilization will have taken place when the substrate temperature decreases from the 120°-140° range to a temperature of 70°-80°. When the temperature so decreases, a major portion of the biostabilization process has been achieved and most of the organic waste has been converted into a brown humus-like material.

Figure 2:
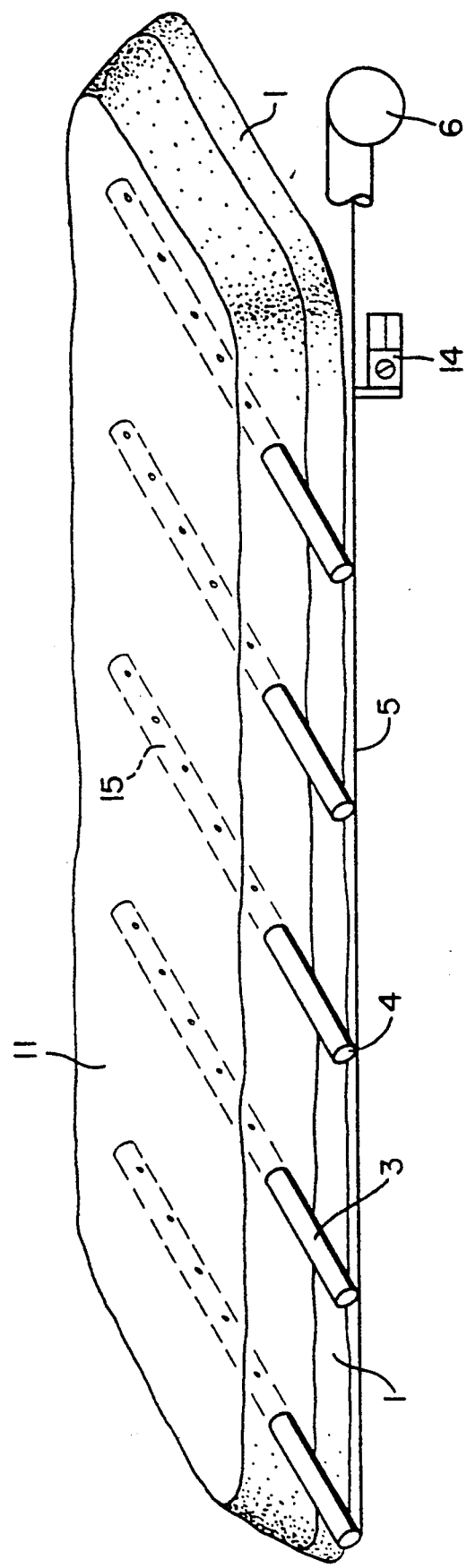
FIG. 2 depicts a mat-shaped stockpile of municipal solid waste placed directly on top of a compacted mat-shaped stockpile of waste such as that depicted in FIG. 1.

Following the biostabilization, the mat-shaped waste may be compacted with standard landfill equipment such as a landfill compactor. Once compacted, fresh waste may be processed using the identical system. However, as shown in FIG. 2, the fresh waste 11 may be stockpiled directly on top of the previously stockpiled and now completed waste 1. After the fresh waste has fully biostabilized, it may be compacted thereby creating a series of layers of compacted mats. A 9 foot high mat-shaped stockpile will be about 3 feet thick after compaction. It is possible to cover the compacted material with the synthetic cover prior to reperforming the steps herein but it is not required.

Although the invention has been disclosed in relation to the embodiments described herein, it is apparent that the various modifications, substitutions, equivalents and other changes may be utilized without departing in any from the spirit of the invention. Any such modification are intended to be within the scope of the invention as defined by the following claims.

I claim:

1. A method for disposing solid waste in a landfill comprising the steps of:
   size reducing said solid waste;
   moisture adjusting said solid waste;
   placing the solid waste in a preselected geometric form thereby forming a waste pile;
   coating the exposed portion of said waste pile with a synthetic covering compound comprising a liquid, a binder, cellulose fibers and plastic fibers;
   biostabilizing said waste pile; and
   compacting said waste pile.

2. The method of claim 1 further comprising aerating the waste pile.

3. The method of claim 1 wherein said reduced waste is placed in a substantially mat-shaped stockpile having a length and width substantially greater than thickness.

4. The method of claim 1 wherein said solid waste is reduced and moisture adjusted simultaneously.

5. The method of claim 1 further comprising the step of placing an aeration means within said waste pile.

6. The method of claim 5 wherein said reduced waste is placed in the mat shaped stockpile having a thickness of at least 4 feet.

7. The method of claim 1 wherein said waste is reduced to particles ranging in size from 2 to 6 inches.

8. The method of claim 1 wherein said reduced waste is moisture adjusted with a water based liquid.

9. The method of claim 1 wherein said reduced waste is moisture adjusted to yield a moisture content of 40 to 60 percent by weight.

10. The method of claim 1 further comprising the step of constructing an aeration means on a preselected location prior to placing the solid waste in a preselected geographic form at said preselected location forming said waste pile.

11. The method of claim 1 wherein said biostabilization is allowed to occur for a period of 60 to 90 days.

12. The method of claim 1 wherein the exposed portion of said waste pile is coated with a synthetic covering compound comprising by weight 30 to 60 percent liquid, 40 to 70 percent binder, one-half to 2 percent cellulose fiber and up to 2 percent plastic fiber.

13. The method of claim 10 wherein synthetic covering compound comprises by weight 38-40 percent liquid, 54-60 percent binder, 1-2 percent cellulose fibers and up to 1/10 of 1 percent plastic fibers.

14. The method of claim 13 wherein the liquid, binder, cellulose fibers and plastic fibers all are recycled material.

15. The method of claim 13 wherein said liquid is a water based liquid.

16. The method of claim 13 wherein the liquid comprises water.

17. The method of claim 13 wherein the liquid comprises landfill leachate.

18. The method of claim 13 wherein the binder comprises cement flyash.

19. The method of claim 13 wherein the binder comprises portland cement.

20. A method for disposing solid waste in a landfill, comprising the steps of:
    reducing said solid waste;
    moisture adjusting said solid waste;
    placing the reduced waste in a set form and in a set place, thereby forming a waste pile;
    coating the exposed portion of said waste pile with a synthetic covering compound;
    biostabilizing said waste pile;
    compacting said waste pile; and
    repeating the steps above upon said set place, thereby forming a plurality of layers of compacted waste.

21. The method of claim 20 further comprising the step of placing an aeration means within said waste pile.

22. The method of claim 20 further comprising assembly an aeration means within a preselected location prior to forming a waste pile upon said preselected location.

23. The method of claim 1 wherein said biostabilization step comprises aerating the said waste pile.

24. The method of claim 23 further comprising the step of moisture adjusting said waste pile after aeration.

25. The method of claim 20 wherein said coating step comprises the steps of:
    mixing a binder, cellulose fibers, plastic fibers and a liquid to form a mixture;
    coating the waste pile with said mixture; and
    allowing said coating to harden.

26. The method of claim 25 wherein said mixture comprises, by weight 38-40 percent liquid, 54-60 percent binder, 1-2 percent cellulose, and up to 1/10 of 1 percent plastic fibers.

27. A method of disposing solid waste in a landfill, comprising the steps of:
    reducing said solid waste;
    moisture adjusting said solid waste;
    providing an aeration means;
    placing the reduced waste in a set form over said aeration means;
    coating said exposed portion of said waste pile with a synthetic covering compound;
    biostabilizing said waste pile;
    compacting said waste pile; and
    repeating the steps above upon the set place, thereby forming a plurality of layers.

28. The method of claim 13 wherein the binder comprises flyash.

* * * * *